US010638513B2

(12) United States Patent
Xue et al.

(10) Patent No.: US 10,638,513 B2
(45) Date of Patent: Apr. 28, 2020

(54) PRE-CODED RTS/CTS FOR SYNCHRONOUS NR-SS

(71) Applicant: QUALCOMM Incorporated, San Diego, CA (US)

(72) Inventors: Yisheng Xue, San Diego, CA (US); Qingsi Wang, Bellevue, WA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/039,141

(22) Filed: Jul. 18, 2018

(65) Prior Publication Data

US 2019/0075595 A1  Mar. 7, 2019

Related U.S. Application Data

(60) Provisional application No. 62/554,310, filed on Sep. 5, 2017.

(51) Int. Cl.
*H04B 7/0456* (2017.01)
*H04B 7/06* (2006.01)
(Continued)

(52) U.S. Cl.
CPC ...... *H04W 74/0808* (2013.01); *H04B 7/0456* (2013.01); *H04B 7/0486* (2013.01);
(Continued)

(58) Field of Classification Search
CPC ............. H04W 74/0808; H04W 16/14; H04W 72/0406; H04B 7/0456; H04B 7/0486;
(Continued)

(56) References Cited

U.S. PATENT DOCUMENTS

2011/0273977 A1* 11/2011 Shapira ............... H04B 7/0452
370/208
2012/0287797 A1* 11/2012 Basson ................ H04W 16/28
370/252
(Continued)

FOREIGN PATENT DOCUMENTS

WO  WO-2011087579 A2 *  7/2011 ........... H04B 7/0634
WO  WO-2016209710 A1 * 12/2016 ........... H04B 17/336

OTHER PUBLICATIONS

International Search Report and Written Opinion—PCT/US2018/042939—ISA/EPO—dated Oct. 24, 2018.

*Primary Examiner* — Michael Thier
*Assistant Examiner* — Brian P Cox
(74) *Attorney, Agent, or Firm* — Liem T. Do

(57) ABSTRACT

Preceded contention reservation signals for synchronous new radio (NR) shared spectrum (NR-SS) networks are disclosed. A transmitter that uses precoded contention reservation signals may be configured either to skip or use the training phase for determining rank parameters. The transmitter participates in contention resolution with its receiver by transmitting the precoded contention reservation signals precoded with tentative rank parameters. After contention interval, receiver sends feedback to the transmitter identifying proposed rank parameters based on the strongest precoded contention signals of any neighboring nodes that also won access to the channel. When configured to skip the training phase, the transmitter sets the rank parameters according to the proposed rank parameters. Otherwise, the transmitter participates in the training phase with other winning nodes transmitting signals identifying proposed rank parameters. The receiver then feeds back refined rank parameters to the transmitter based on each of the proposed rank parameters of the training phase.

22 Claims, 9 Drawing Sheets

(51) Int. Cl.
*H04W 74/08* (2009.01)
*H04W 72/04* (2009.01)
*H04W 16/14* (2009.01)
*H04L 5/00* (2006.01)
*H04L 1/00* (2006.01)
*H04L 1/20* (2006.01)
*H04L 5/14* (2006.01)

(52) U.S. Cl.
CPC .......... *H04B 7/063* (2013.01); *H04B 7/0617* (2013.01); *H04B 7/0634* (2013.01); *H04L 1/0026* (2013.01); *H04L 1/20* (2013.01); *H04L 5/0053* (2013.01); *H04W 16/14* (2013.01); *H04W 72/0406* (2013.01); *H04L 5/0023* (2013.01); *H04L 5/0035* (2013.01); *H04L 5/0048* (2013.01); *H04L 5/0055* (2013.01); *H04L 5/0091* (2013.01); *H04L 5/1469* (2013.01)

(58) Field of Classification Search
CPC .... H04B 7/0617; H04B 7/063; H04B 7/0634; H04L 1/0026; H04L 1/20; H04L 5/0053; H04L 5/0023; H04L 5/0035; H04L 5/0048; H04L 5/0055; H04L 5/0091; H04L 5/1469
See application file for complete search history.

(56) References Cited

U.S. PATENT DOCUMENTS

| | | | |
|---|---|---|---|
| 2016/0065284 A1* | 3/2016 | Yu | H04W 16/28 370/329 |
| 2017/0303313 A1* | 10/2017 | Cariou | H04B 17/336 |
| 2018/0006705 A1* | 1/2018 | Cariou | H04L 69/28 |
| 2019/0045542 A1* | 2/2019 | Yang | H04B 7/0456 |

* cited by examiner

PRE-CODED RTS/CTS FOR SYNCHRONOUS NR-SS

CROSS-REFERENCE TO RELATED APPLICATIONS

This application claims the benefit of U.S. Provisional Patent Application No. 62/554,310, entitled, "PRE-CODED RTS/CTS FOR SYNCHRONOUS NR-SS," filed on Sep. 5, 2017, which is expressly incorporated by reference herein in its entirety.

BACKGROUND

Field

Aspects of the present disclosure relate generally to wireless communication systems, and more particularly, to pre-coded request-to-send (RTS)/clear-to-send (CTS) for synchronous new radio (NR) shared spectrum (NR-SS) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs), A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes participating, by a data transmitter, in a contention resolution process during a contention interval with a data receiver for access to a shared communication channel, wherein the data transmitter transmits a precoded contention reservation signal precoded with tentative rank parameters, receiving, by the data transmitter, post-contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel, setting, by the data transmitter, the data transmission rank parameters according to feedback received from the data transmitter, and transmitting, by the data transmitter, data to the data receiver using the data transmission rank parameters.

In an additional aspect of the disclosure, a method of wireless communication includes participating, by a data receiver, in a contention resolution process during a contention interval with a data transmitter contending for access to a shared communication channel, wherein the data receiver receives a precoded contention reservation signal precoded with tentative rank parameters from the data transmitter, detecting, by the data receiver, one or more sets of precoded contention reservation signals detected above a threshold energy level during the contention interval from one or more nodes contending for access to the shared communication channel, transmitting, by the data receiver, post-contention feedback after the contention interval, wherein the post-contention feedback includes post-contention rank parameters based on one or more of the one or more sets of precoded contention reservation signals from one or more nodes that won access to the shared communication channel, and receiving, at the data receiver, data from the data transmitter transmitted according to data transmission rank parameters based on feedback transmitted by the data receiver.

In an additional aspect of the disclosure, an apparatus configured for wireless communication includes means for participating, by a data transmitter, in a contention resolution process during a contention interval with a data receiver for access to a shared communication channel, wherein the data transmitter transmits a precoded contention reservation signal precoded with tentative rank parameters, means for receiving, by the data transmitter, post-contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel, means for setting, by the data transmitter, the data transmission rank parameters according to feedback received from the data transmitter, and means for transmitting, by the data transmitter, data to the data receiver using the data transmission rank parameters.

In an additional aspect of the disclosure, an apparatus configured for wireless communication includes means for participating, by a data receiver, in a contention resolution process during a contention interval with a data transmitter contending for access to a shared communication channel, wherein the data receiver receives a precoded contention reservation signal precoded with tentative rank parameters from the data transmitter, means for detecting, by the data receiver, one or more sets of precoded contention reservation signals detected above a threshold energy level during the contention interval from one or more nodes contending for access to the shared communication channel, means for transmitting, by the data receiver, post-contention feedback after the contention interval, wherein the post-contention feedback includes post-contention rank parameters based on one or more of the one or more sets of precoded contention reservation signals from one or more nodes that won access to the shared communication channel, and means for receiving, at the data receiver, data from the data transmitter transmitted according to data transmission rank parameters based on feedback transmitted by the data receiver.

In an additional aspect of the disclosure, a non-transitory computer-readable medium having program code recorded thereon. The program code further includes code to participate, by a data transmitter, in a contention resolution process during a contention interval with a data receiver for access to a shared communication channel, wherein the data transmitter transmits a precoded contention reservation signal precoded with tentative rank parameters, code to receive, by the data transmitter, post-contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel, code to set, by the data transmitter, the data transmission rank parameters according to feedback received from the data transmitter, and code to transmit, by the data transmitter, data to the data receiver using the data transmission rank parameters.

In an additional aspect of the disclosure, a non-transitory computer-readable medium having program code recorded thereon. The program code further includes code to participate, by a data receiver, in a contention resolution process during a contention interval with a data transmitter contending for access to a shared communication channel, wherein the data receiver receives a precoded contention reservation signal precoded with tentative rank parameters from the data transmitter, code to detect, by the data receiver, one or more sets of precoded contention reservation signals detected above a threshold energy level during the contention interval from one or more nodes contending for access to the shared communication channel, code to transmit, by the data receiver, post-contention feedback after the contention interval, wherein the post-contention feedback includes post-contention rank parameters based on one or more of the one or more sets of preceded contention reservation signals from one or more nodes that won access to the shared communication channel, and code to receive, at the data receiver, data from the data transmitter transmitted according to data transmission rank parameters based on feedback transmitted by the data receiver.

In an additional aspect of the disclosure, an apparatus configured for wireless communication is disclosed. The apparatus includes at least one processor, and a memory coupled to the processor. The processor is configured to participate, by a data transmitter, in a contention resolution process during a contention interval with a data receiver for access to a shared communication channel, wherein the data transmitter transmits a precoded contention reservation signal precoded with tentative rank parameters, to receive, by the data transmitter, post-contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel, to set, by the data transmitter, the data transmission rank parameters according to feedback received from the data transmitter, and to transmit, by the data transmitter, data to the data receiver using the data transmission rank parameters.

In an additional aspect of the disclosure, an apparatus configured for wireless communication is disclosed. The apparatus includes at least one processor, and a memory coupled to the processor. The processor is configured to participate, by a data receiver, in a contention resolution process during a contention interval with a data transmitter contending for access to a shared communication channel, wherein the data receiver receives a precoded contention reservation signal precoded with tentative rank parameters from the data transmitter, to detect, by the data receiver, one or more sets of precoded contention reservation signals detected above a threshold energy level during the contention interval from one or more nodes contending for access to the shared communication channel, to transmit, by the data receiver, post-contention feedback after the contention interval, wherein the post-contention feedback includes post-contention rank parameters based on one or more of the one or more sets of precoded contention reservation signals from one or more nodes that won access to the shared communication channel, and to receive, at the data receiver, data from the data transmitter transmitted according to data transmission rank parameters based on feedback transmitted by the data receiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings, in the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
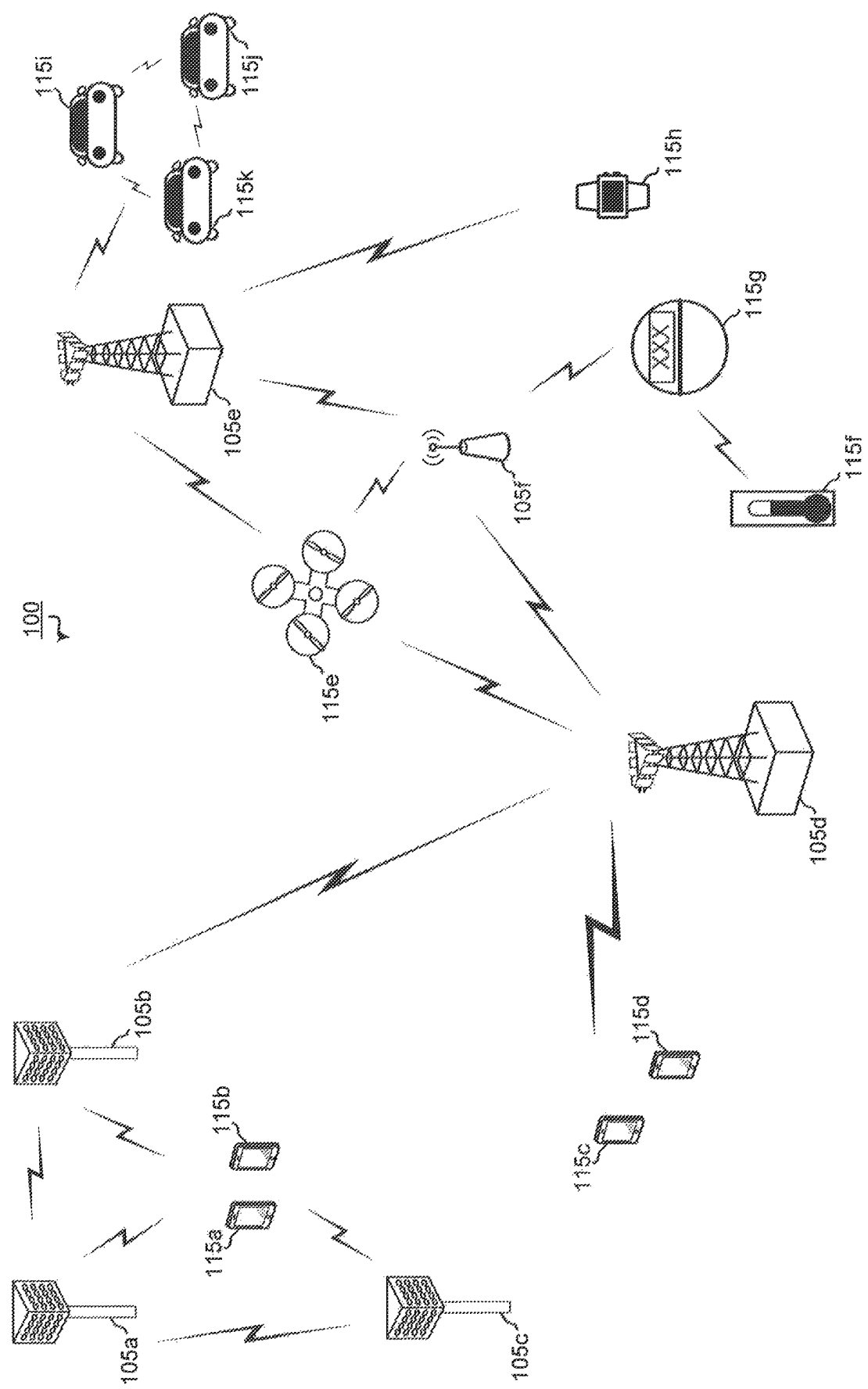
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like, UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation. Partnership Project (3GPP) is a collaboration between groups of telecommunications associations that aims to define a globally applicable third generation (3G) mobile phone specification. 3GPP long term evolution (LIE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LIE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3GHz FDD/TDD implementations, subcarrier spacing may occur with 15 kHz, for example over 1, 5, 10, 20 MHz, and the like bandwidth. For other various outdoor and small cell coverage deployments of TDD greater than 3 subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries, 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MEMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
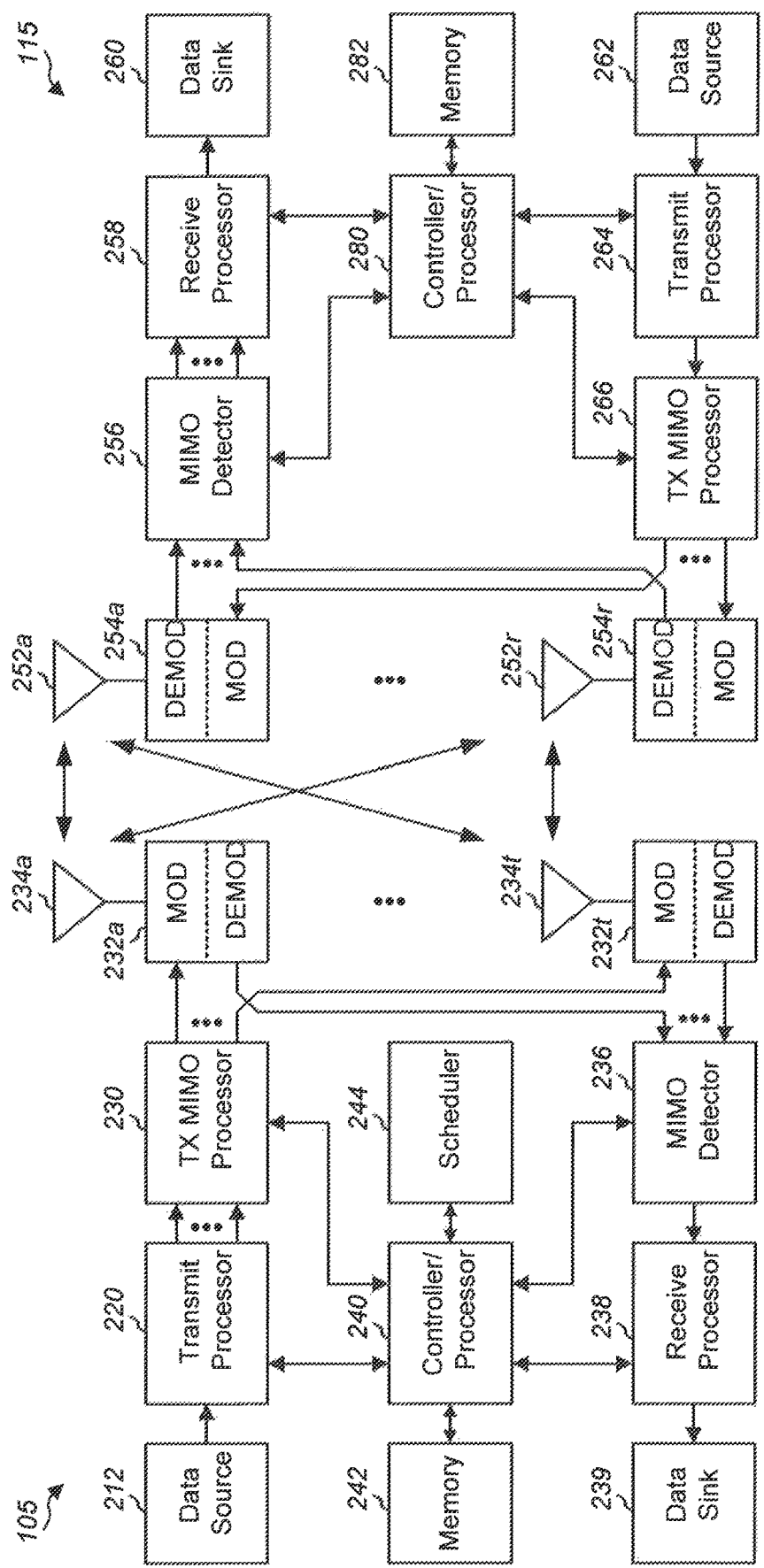
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A-5B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
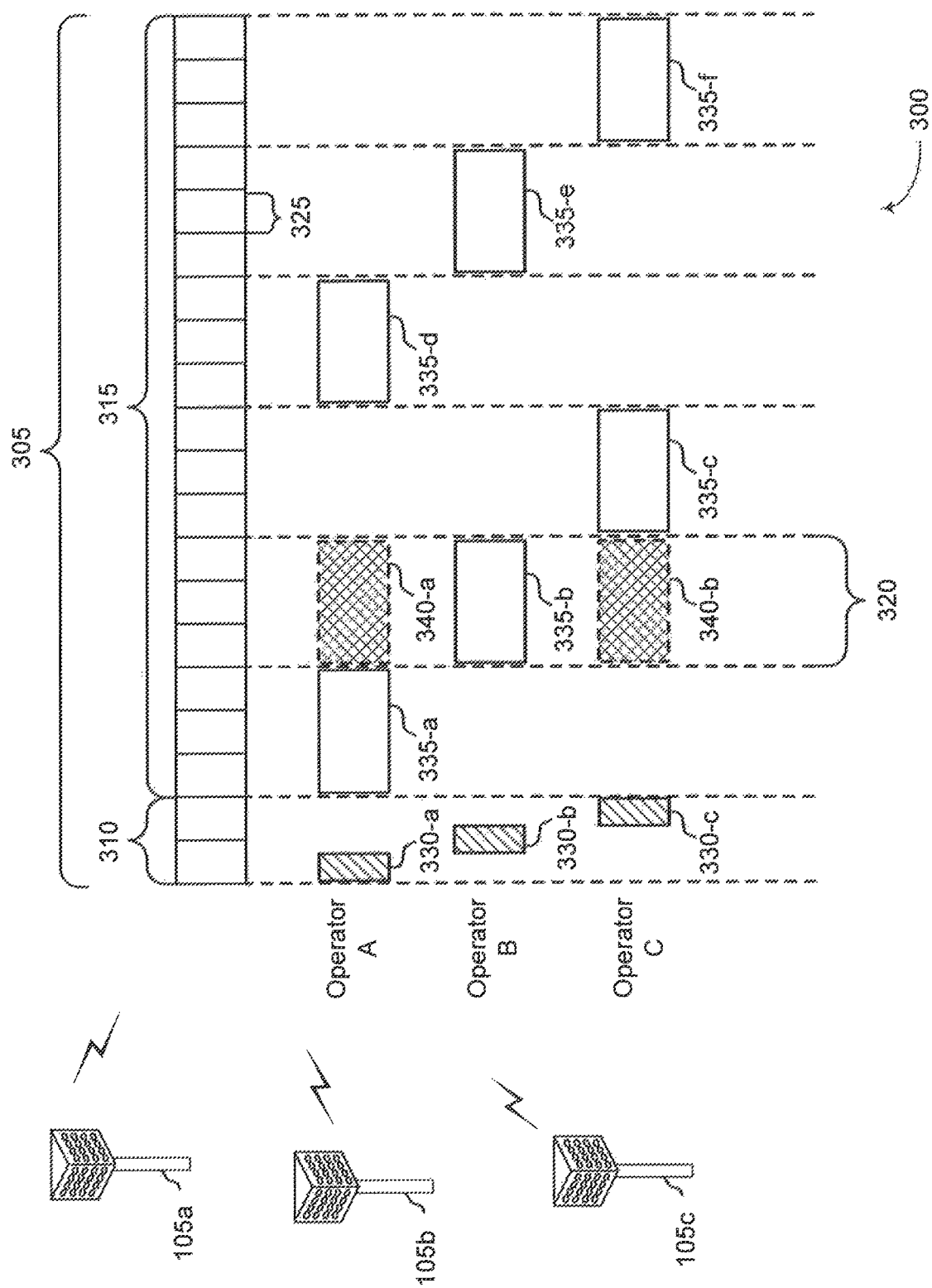
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In sonic examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e,g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e,g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-*b*, and 340-*b* all represent the same time resources (e.g., a particular sub-interval 320), but are identified separately to signify that the same resources may be considered as a O-INT for, some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its O-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above, in some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive O-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In synchronous NR-SS networks, reservation signals like request-to-send (RTS) and clear-to-send (CTS) may be transmitted in the contention interval to compete for the medium access. The access winners may then utilize training phase signals to finalize the rate control for transmission (rank, transmission beam forming, and modulation and coding scheme (MCS)). The training phase signals may include an indication of a tentative pilot rank and tentative transmission beamforming parameters. The surrounding nodes that win access to the medium each send such training phase signals for others to predict interference. Thus, the nodes will attempt to negotiate rank and transmission beamforming for data transmission during this training phase.

Figure 4:
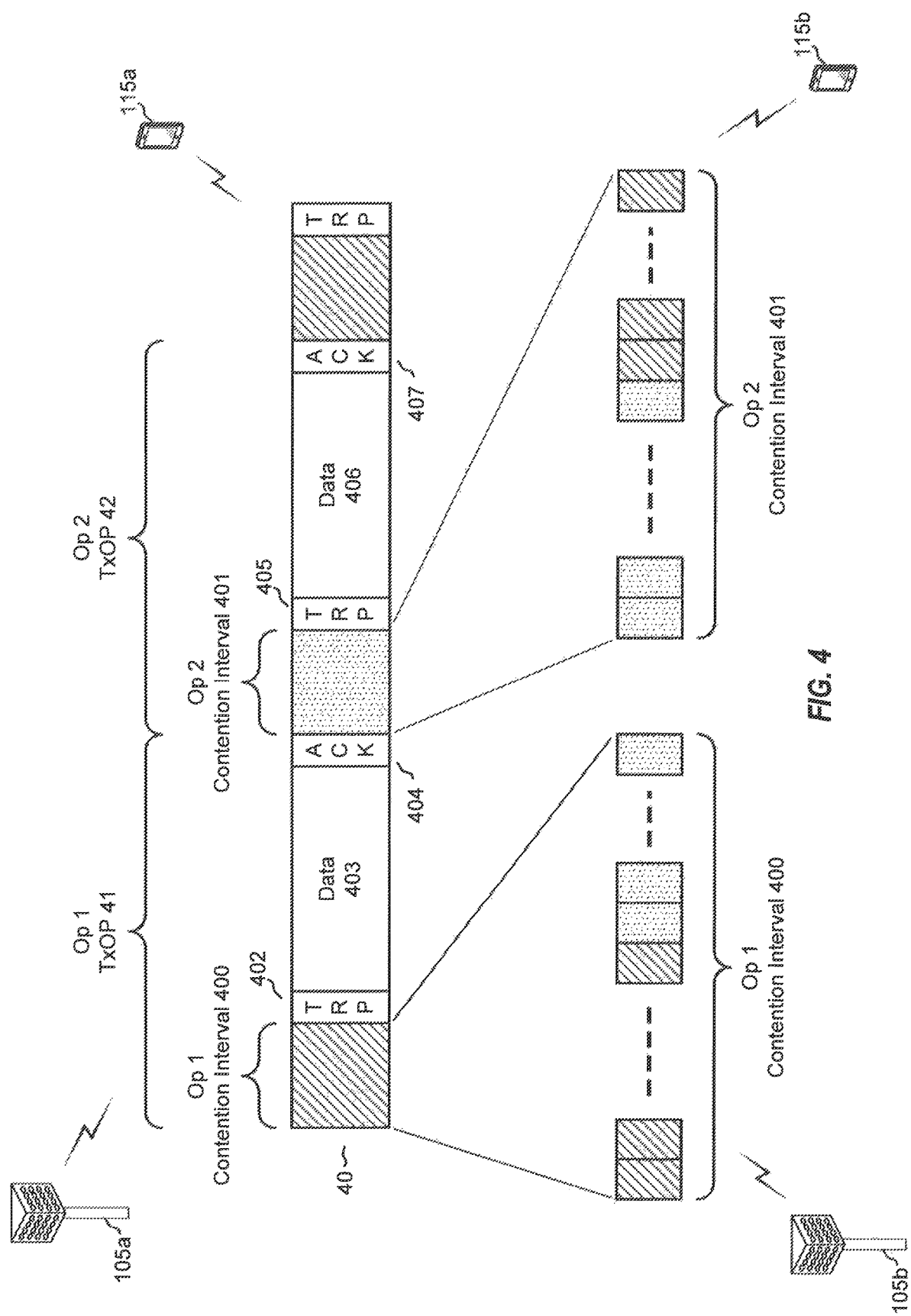
FIG. 4 is a block diagram illustrating base stations and UEs operating within an NR-SS communication network.

FIG. 4 is a block diagram illustrating base stations 105*a* and 105*b* and UEs 115*a* and 115*b* operating within an NR-SS communication network. Base station 105*a*, which provides communication with UE 115*a*, operates with a first network operator, while base station 105*b*, which provides communications with UE 115*b*, operates with a second network operator. Each set of communicating nodes communicates using shared communication channel 40. Shared communication channel 40 may be divided into a number of different transmission opportunities, such as TxOP 41, for the first network operator, and TxOP 42, for the second network operator. Each such transmission opportunity may be configured to provide priority access for the different network operators.

Within TxOP 41, the first network operator, to which base station 105*a* and UE 115*a* belongs, may have priority access.

Contention operations may occur within contention interval 400. When base station 105a wants access to shared communication channel 40 during TxOP 41, it may perform a contention operation, such as RTS/CTS, within contention interval 400. The RTS/CTS operations in the contention interval 400 are omni-directional. These contention operations may instruct base station 105b and UE 115b that it may not be able to transmit within TxOP 41. If base station 105a or UE 115a had no transmissions for TxOP 41, base station 105b or UE 115b may be able to opportunistically reserve shared communication channel 40 through their own omni-directional RTS/CTS operations in contention interval 400 for communications during TxOP 41, even though its operator, the second network operator, does not have the priority for communications for TxOP 41. If base station 105a wins reservation of shared communication channel 40, then it may transmit data 403 followed by a location scheduled for acknowledgements 404. Acknowledgements 404 may include both positive acknowledgements (ACK) and negative acknowledgements (NAK).

Similarly, at TxOP 42, the priority access is provided to base station 105b and UE 115b, as part of the second network operator. After performing omnidirectional contention operations within contention interval 401, base station 105b and UE 115b may communicate data 406 followed by acknowledgements 407.

After each of contention intervals 400 and 401, a location is scheduled for each of the nodes winning access to shared communication channel 40 to transmit training phase signals, training phases (TRPs) 402 and 405. Each of the winning neighboring transmitters transmits training phase signals in TRPs 402 and 405 that include a tentative pilot rank and tentative transmission beamforming parameters. In the described example, UE 115a receives the training phase signals from base stations 105a and 105b and may provide some type of feedback to base station 105a. The feedback from UE 115a provides base station 105a with an indication of the interference experienced at UE 115a based on the transmissions of base station 105b, which allows base station 105a to intelligently set transmission parameters, such as rank, transmission beamforming parameters, MCS, and the like.

Under current considerations, the synchronous NR-SS design assumes omni-directional contention operations, such as RTS/CTS, for medium access contention in the contention interval. Once access to the medium is won by one or more different transmitters, the training phase may then be used to negotiate transmission settings (e.g., transmission beamforming, MCS, etc.) that may be beneficial for the different transmitter/receiver pairs accessing the medium. The tentative transmission parameters, such as tentative pilot rank, tentative beamforming parameters, and the like, are identified with the training phase signals for this transmission parameter refining procedure.

Various aspects of the present disclosure are directed to using directional contention operations, such as RTS/CTS, while precoding tentative transmission parameters in the contention operations. For example, with scheduled downlink transmissions, the base station may precode tentative pilot rank and tentative beamforming vectors into RTS, while, for scheduled uplink transmissions, the scheduled UE may precode tentative pilot rank and tentative beamforming vectors into CTS. Such tentative rank and beamforming vector values may be taken from the most recent values used during the last transmission opportunity. Thus, in the case of scheduled uplink transmissions, the UE may include the values of the tentative rank and beamforming vectors of the last uplink transmission opportunity into the CTS signal, thus, precoding the CTS with the tentative rank and beamforming vectors. Similar steps may be taken by a base station for scheduled downlink transmissions, by including the tentative rand and beamforming vector values from the previously scheduled downlink transmission opportunity. The winning nodes may then use these tentative transmission parameters observed during the contention interval to determine a refined set of transmission parameters that accounts for the possible interference experienced at the receiver.

It should be noted that some aspect would provide sufficient design properties to allow the proposed transmission parameters determined from precoded tentative transmission parameters to fully replace the training phase, thus, conserving significant resources. Other aspects may continue to use the training phase procedure to further refine the proposed transmission parameters using estimated interference from the winning nodes. Whether or not the transmitter skips the training phase or uses the training phase to further refine the data rank and transmission beamforming vectors, may be determined in advance with a signal, such as a transmission configuration signal, to indicate either the training phase configuration or the no training phase configuration.

Figure 5A:
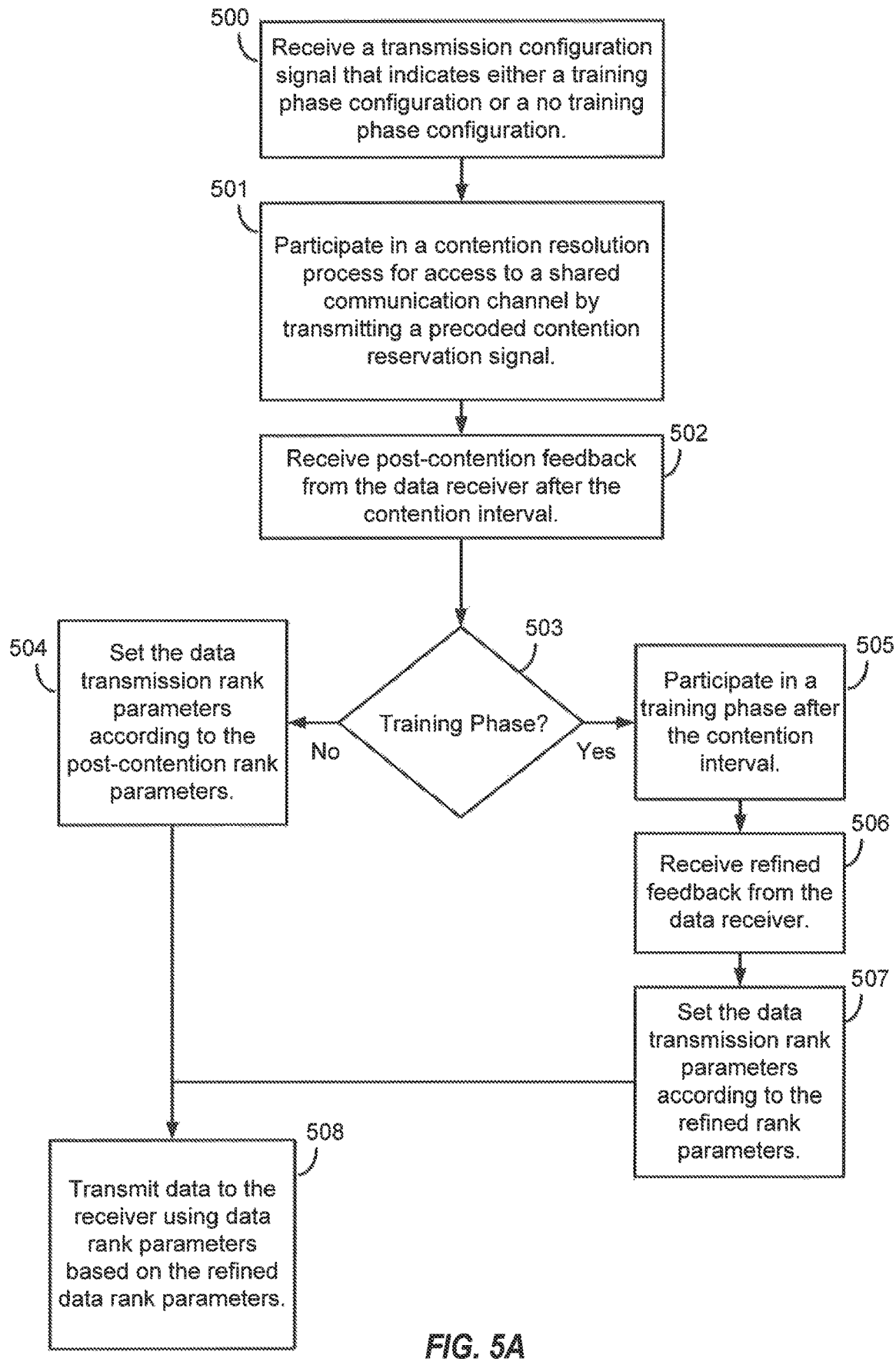
FIGS. 5A and 5B are block diagrams illustrating example blocks executed to implement aspects of the present disclosure.
Figure 7:
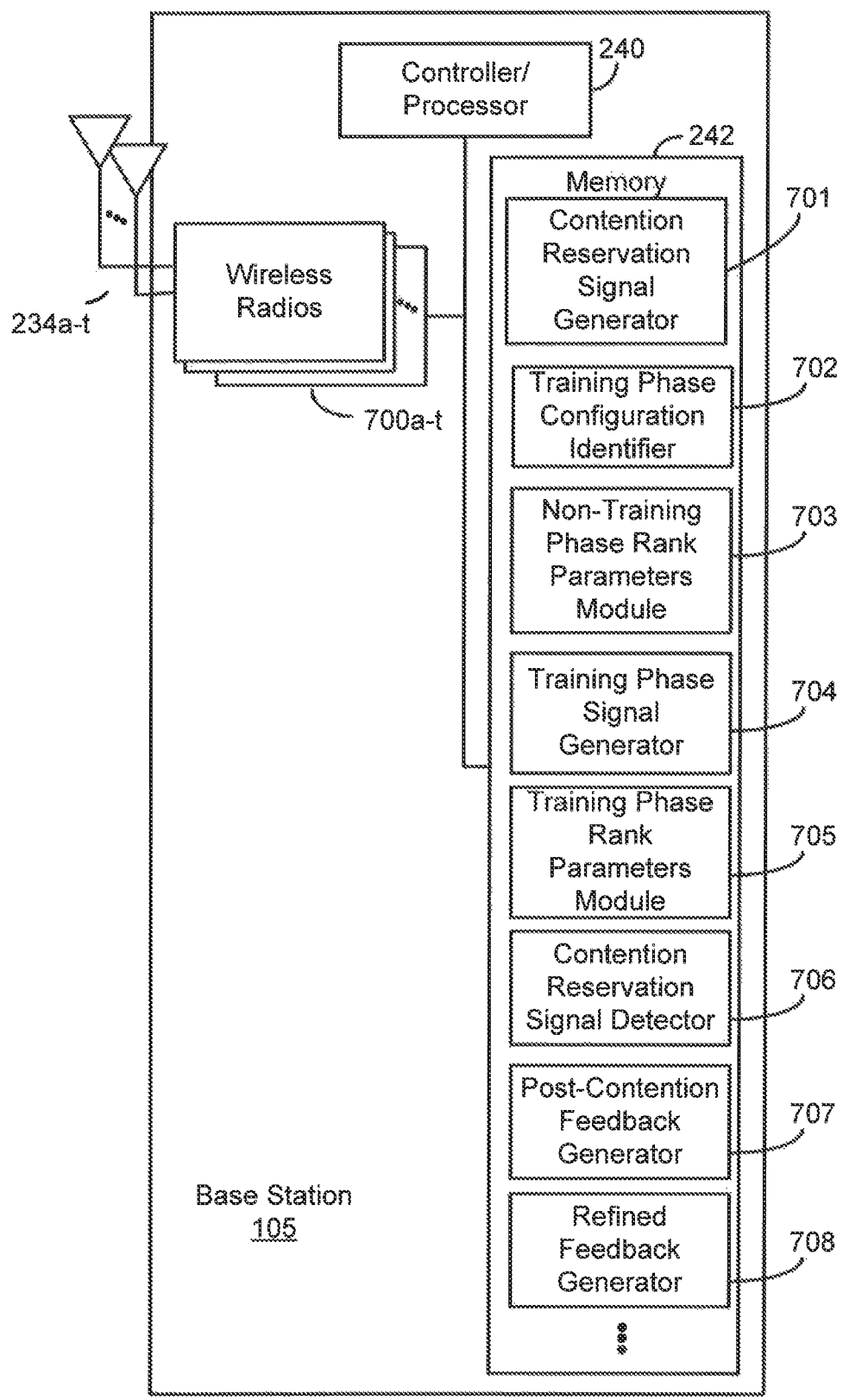
FIG. 7 is a block diagram illustrating an eNB configured according to one aspect of the present disclosure.
Figure 8:
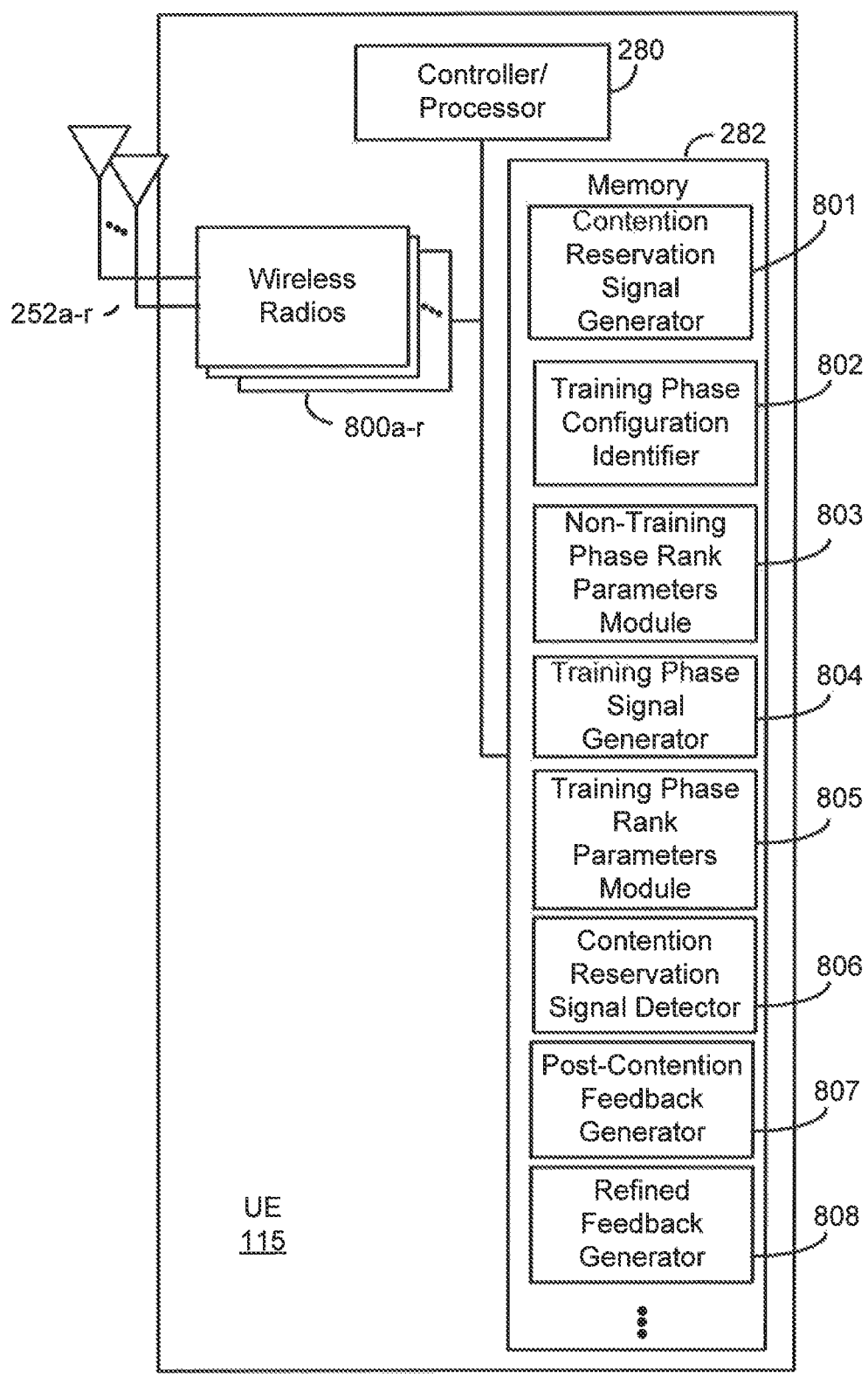
FIG. 8 is a block diagram illustrating am UE configured according to one aspect of the present disclosure.

FIG. 5A is a block diagram illustrating example blocks executed by a transmitter to implement one aspect of the present disclosure. The example blocks will also be described with respect to base station 105 and UE 115, as illustrated in FIGS. 7 and 8, respectively. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t include various components and hardware, as illustrated in FIG. 2 for base station 105, including modulator/demodulators 232a-t, MIMO detector 236, receive processor 238, transmit processor 220, and TX MIMO processor 230.

FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115, UE 115, under control of controller/processor 280, transmits and receives signals via wireless radios 800a-r and antennas 252a-r. Wireless radios 800a-r include various components and hardware, as illustrated in FIG. 2 for base station 105, including modulator/demodulators 254a-r, MIMO detector 256, receive processor 258, transmit processor 264, and TX MIMO processor 266.

At block 500, the data transmitter receives a transmission configuration signal that indicates either a training phase configuration or a no training phase configuration. For example, base station 105 may receive the transmission configuration signal via antennas 234a-t and wireless radios 700a-t. Alternatively, UE 115 may receive the transmission configuration signal via wireless radios 800a-r and antennas 252a-r. As noted above, the receiving probability of the contention reservation signal may contribute to the determination of whether the training phase configuration or no training phase configuration are identified.

At block 501, the data transmitter participates in a contention resolution process for access to a shared communication channel by transmitting a precoded contention reservation signal. For example, base station 105, under control of controller/processor 240, may activate contention reservation signal generator 701, stored in memory 242. The execution environment of contention reservation signal generator 701 allows base station 105 to generate a precoded contention reservation signal and to transmit the precoded contention reservation signal via wireless radios 1100*a-t* and antennas 234*a-t*. Alternatively, UE 115, under control of controller/processor 280, may activate contention reservation signal generator 801, stored in memory 282. The execution environment of contention reservation signal generator 801 allows UE 115 to generate a precoded contention reservation signal and to transmit the precoded contention reservation signal via wireless radios 1200*a-r* and antennas 252*a-r*. The contention reservation process includes the signals from the data transmitter and the response from the data receiver. The RTS/CTS procedure fulfills this contention resolution signaling procedure. When the base station, e.g., base station 105, is the data transmitter, its RTS precoded with tentative rank parameters, generated and transmitted using contention reservation signal generator 701, may be responded to by the UE-receiver sending a CTS, e.g., UE 115 using contention reservation signal generator 801. According to aspects of the present disclosure, the CTS from the UE-receiver, such as UE 115, may be precoded to identify the proposed data rank parameters based on the tentative rank parameters that the UE-receiver decoded in the precoded RTS from the base station-transmitter, e.g., base station 105, or it may simply be a non-precoded CTS for completion of the contention reservation procedure by the UE-receiver. Similarly, a base station-receiver, such as base station 105, would initially transmit an RTS for the contention resolution process. That RTS from the base station-receiver may be triggered by uplink scheduling requests from the UE-transmitter, such as UE 115, or otherwise. The RTS of the base station-receiver may also be precoded or not. Thus, for scheduled uplink, the contention reservation process would entail an RTS from the base station-receiver (either precoded or not) followed by the CTS precoded with tentative rank parameters from the UE-transmitter.

At block 502, the data transmitter receives post-contention feedback from the data receiver after the contention interval. For example, base station 105 may receive the post-contention feedback from UE 115 via antennas 234*a-t* and wireless radios 700*a-t*. Alternatively, UE 115 may receive the post-contention feedback from base station 105 via wireless radios 800*a-r* and antennas 252*a-r*. The post-contention feedback from the data receiver will include post-contention rank parameters based on interference estimates using not only the tentative rank parameters from the transmitter, but also other tentative rank parameters from some of the neighboring transmitters that have won access to the channel. During the contention interval, other competing neighboring transmitters and receivers may also transmit precoded contention reservation signals. While the data receiver may be able to detect and decode these neighboring precoded contention reservation signals, the post-contention rank parameters would take into account estimated transmissions of the data transmitter and any other neighboring transmitter that has also won access to the shared channel and which precoded contention reservation signal was detected by the data receiver above a certain threshold energy level. Thus, the post-contention feedback would only propose post-contention rank parameters that account for the strongest potentially interfering transmissions.

At block 503, a determination is made whether the transmission configuration signal identifies the training phase configuration or not. For example, base station 105, under control of controller/processor 240, may activate training phase configuration identifier 702, stored in memory 242. The execution environment of training phase configuration identifier 702 allows base station 105 to determine whether the transmission configuration signal received at block 500 identifies a training phase configuration or not. Alternatively, UE 115, under control of controller/processor 280, may activate training phase configuration identifier 802, stored in memory 282. The execution environment of training phase configuration identifier 802 allows UE 115 to determine whether the transmission configuration signal received at block 500 identifies a training phase configuration or not If the transmission configuration signal received at block 500 does not identify a training phase configuration, then, at block 504, the data transmitter refrains from participating in a training phase and sets the data transmission rank parameters according to the post-contention rank parameters. For example, base station 105, under control of controller/processor 240, may activate non-training phase rank parameters module 703, stored in memory 242. The execution environment of non-training phase rank parameters module 703 allows base station 105 to set the data transmission rank parameters according to the post-contention rank parameters. Alternatively, UE 115, under control of controller/processor 280, may activate data transmission rank parameters module 803, stored in memory 282. The execution environment of data transmission rank parameters module 803 allows UE 115 to set the data transmission rank parameters according to the post-contention rank parameters. Because the training phase here will be skipped, the data transmitter would rely on the post-contention rank parameters to set its rank and transmission beamforming vectors or matrix for data transmissions.

Otherwise, if the transmission configuration signal identifies the training phase configuration, then, at block 505, the data transmitter will participate in a training phase procedure after the contention interval. The data transmitter will transmit training phase signals that identify proposed rank parameters. For example, base station 105, under control of controller/processor 240, may activate training phase signal generator 704, stored in memory 242. The execution environment of training phase signal generator 704 allows base station 105 to generate training phase signals that identify proposed rank parameters, and to transmit the training phase signals via wireless radios 700*a-t* and antennas 234*a-t*. Alternatively, UE 115, under control of controller/processor 280, may activate training phase signal generator 804, stored in memory 282. The execution environment of training phase signal generator 804 allows UE 115 to generate training phase signals that identify proposed rank parameters, and to transmit the training phase signals via wireless radios 800*a-r* and antennas 252*a-r*. The proposed rank parameters may be based on the post-contention rank parameters received in the post-contention feedback. Any other neighboring transmitters that have also won access to the shared channel will similarly negotiate to set the appropriate rank parameters by also transmitting their own training phase signals identifying the proposed rank parameters.

At block 506, the data transmitter receives refined feedback from the data receiver. The refined feedback from the receiver identifies the refined data rank parameters based on interference estimated using the proposed rank parameters of each of the transmitters winning access to the shared channel, including the data transmitter associated with the data receiver and the other winning neighbor transmitters that participated in the training phase. For example, for scheduled downlink, base station 105 may receive the refined feedback from UE 115 via antennas 234*a-t* and wireless radios 700*a-t,* while for scheduled uplink, UE 115 may receive the refined feedback from base station 105 via wireless radios 800*a-r* and antennas 252*a-r.*

At block 507, the data transmitter sets the data transmission rank parameters according to the refined rank parameters identified in the refined feedback. For example, base station 105, under control of controller/processor 240, may activate training phase rank parameters module 705, stored in memory 242. The execution environment of training phase rank parameters module 705 allows base station 105 to set the data transmission rank parameters according to the post-contention rank parameters. Alternatively, UE 115, under control of controller/processor 280, may activate training phase rank parameters module 805, stored in memory 282. The execution environment of training phase rank parameters module 805 allows UE 115 to set the data transmission rank parameters according to the post-contention rank parameters. When the transmission configuration signal identifies the training phase configuration, the final data transmission rank parameters take into account the more directly estimated interference that may be caused by each of the transmitters that have won access to the shared communication channel. This estimated interference may be calculated based on the proposed rank parameters identified in the data transmitter's training phase signals, and the proposed rank parameters identified in the other channel-winning neighboring nodes' training phase signals above a particular energy threshold.

It should be noted that when the data transmitter receives the refined feedback with the refined data rank parameters, it may still make the final determination of the rank and transmission beamforming parameters to use for transmitting the data. However, unless an overriding circumstance is present, the data transmitter may generally use the refined data rank parameters, which takes into account interference characteristics of the receiver based on the rank parameters of each of the transmitters that won access to the shared channel. As such, the resulting rank and transmission beamforming parameters may be less selfish than the legacy rank control engine determination.

Figure 5B:
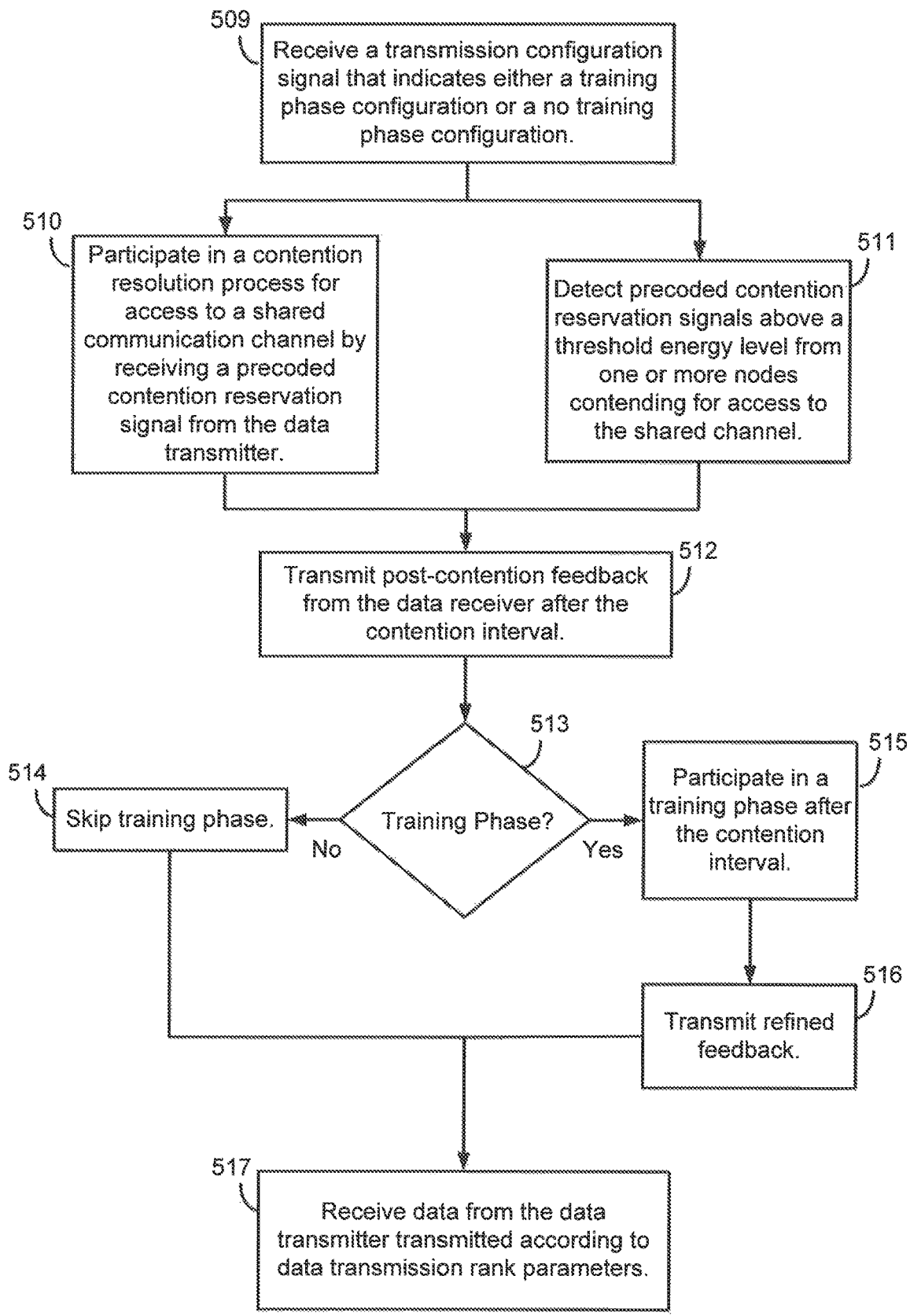

FIG. 5B is a block diagram illustrating example blocks executed by a receiver to implement one aspect of the present disclosure. At block 509, the data receiver receives a transmission configuration signal that indicates either a training phase configuration or a no training phase configuration. For example, base station 105 may receive the transmission configuration signal via antennas 234*a-t* and wireless radios 700*a-t*. Alternatively, UE 115 may receive the transmission configuration signal via wireless radios 800*a-r* and antennas 252*a-r.* As noted above, the receiving probability of the contention reservation signal, whether at a base station-receiver or UE receiver, may contribute to the determination of whether the training phase configuration or no training phase configuration are identified.

At block 510, a data receiver participates in a contention resolution process for access to a shared communication channel by receiving a precoded contention reservation signal from the transmitter. As noted above with respect to FIG. 5A, the data transmitter and data receiver participate in the contention resolution process to gain access to the shared channel. A base station-transmitter/TIE-receiver or UE-transmitter/base station-receiver would exchange RTS/CTS to complete the contention resolution process. The data transmitter, whether a base station or UE, would transmit a precoded contention reservation signal (base station—precoded RTS, UE—precoded CTS) precoded with tentative rank parameters, while the data receiver's contention reservation signal may be either precoded or not. For example, base station 105, under control of controller/processor 240, may activate contention reservation signal generator 701, stored in memory 242. The execution environment of contention reservation signal generator 701 allows base station 105 to generate a contention reservation signal, which may be precoded or not, and to transmit the contention reservation signal via wireless radios 1100*a-t* and antennas 234*a-t.* Alternatively, UE 115, under control of controller/processor 280, may activate contention reservation signal generator 801, stored in memory 282. The execution environment of contention reservation signal generator 801 allows UE 115 to generate a contention reservation signal, which may be precoded or not, and to transmit the contention reservation signal via wireless radios 1200*a-r* and antennas 252*a-r.*

At block 511, the data receiver detects precoded contention reservation signals above a threshold energy level from one or more nodes contending for access to the shared channel. For example, base station 105, under control of controller/processor 240, may activate contention reservation signal detector 706, stored in memory 242. The execution environment of contention reservation signal detector 706 allows base station 105, using wireless radios 700*a-t* and antennas 234*a-t,* to detect and decode precoded contention reservation signals above a threshold energy level from one or more nodes contending for access to the shared channel. Alternatively, UE 115, under control of controller/processor 280, may activate contention reservation signal detector 806, stored in memory 282. The execution environment of contention reservation signal detector 806 allows UE 115, using wireless radios 800*a-r* and antennas 252*a-r,* to detect and decode precoded contention reservation signals above a threshold energy level from one or more nodes contending for access to the shared channel. During the contention interval, other neighboring nodes may also contend for access to the shared communication channel. While these nodes may not have priority access over the data transmitter/receiver, they may still participate in the contention resolution procedure during the contention interval. These neighboring nodes will transmit contention reservation signals, including contention reservation signals precoded with tentative rank parameters from at least the neighboring transmitters. The data receiver may detect and decode these neighboring contention reservation signals, including the signals precoded with the neighboring tentative rank parameters. However, the contention reservation signal transmitted by the data receiver will either be uncoded or at most be precoded with only the consideration of interference based on the data transmitter's transmissions.

At block 512, the data receiver transmits post-contention feedback after the contention interval, wherein the post-contention feedback includes post-contention rank parameters based on one or more sets of precoded contention reservation signals from one or more nodes that won access to the shared communication channel. After the contention interval, the nodes that have won access to the shared channel are determined. For example, base station 105, under control of controller/processor 240, may activate post-contention feedback generator 707, stored in memory 242. The execution environment of post-contention feedback generator 707 allows base station 105 to determine the nodes that have won access to the shared channel. Alternatively, UE 115, under control of controller/processor 280, may activate post-contention feedback generator 807, stored in memory 282. The execution environment of post-contention feedback generator 807 allows UE 115 to determine the nodes that have won access to the shared channel. With the knowledge of the winning transmitters, the data receiver may use the tentative rank parameters that were transmitted as a part of the winning transmitters' precoded contention reservation signals to estimate possible interference at the data receiver caused by the transmissions of all of the winning nodes. For example, the execution environment of post-contention feedback generator 707 may allow base station 105 to estimate possible interference at the data receiver caused by the transmissions of all of the winning nodes. Alternatively, the execution environment of post-contention feedback generator 807 may allow UE 115 to estimate possible interference at the data receiver caused by the transmissions of all of the winning nodes. Moreover, the data receiver would filter the neighboring nodes according to the strength of their contention reservation signals. For example, the execution environment of post-contention feedback generator 707 may allow base station 105 to filter the neighboring nodes according to the strength of their contention reservation signals. Alternatively, the execution environment of post-contention feedback generator 807 may allow UE 115 to filter the neighboring nodes according to the strength of their contention reservation signals. Thus, the neighboring nodes with a received signal strength above a threshold energy level would be considered for this interference estimate. The data receiver may then determine the proposed rank and transmission beamforming vectors using this interference estimate (post-contention rank parameters). For example, the execution environment of post-contention feedback generator 707 may allow base station 105 to determine the proposed rank and transmission beamforming vectors using this interference estimate (post-contention rank parameters). Alternatively, the execution environment of post-contention feedback generator 807 may allow UE 115 to determine the proposed rank and transmission beamforming vectors using this interference estimate (post-contention rank parameters). The data receiver communicates these post-contention rank parameters to the data transmitter in the post-contention feedback. For example, base station 105 may transmit the post-contention feedback to UE 115 via antennas 234*a-t* and wireless radios 700*a-t*. Alternatively, UE 115 may transmit the post-contention feedback to base station 105 via wireless radios 800*a-r* and antennas 252*a-r*.

At block 513, a determination is made whether the transmission configuration signal identifies the training phase configuration or not. For example, base station 105, under control of controller/processor 240, may activate training phase configuration identifier 702, stored in memory 242. The execution environment of training phase configuration identifier 702 allows base station 105 to determine whether the transmission configuration signal received at block 509 identities a training phase configuration or not. Alternatively, UE 115, under control of controller/processor 280, may activate training phase configuration identifier 802, stored in memory 282. The execution environment of training phase configuration identifier 802 allows UE 115 to determine whether the transmission configuration signal received at block 509 identifies a training phase configuration or not. If the transmission configuration signal does not identify the training phase configuration, then, at block 514, the data receiver skips the training phase. Skipping the training phase triggers the data receiver to refrain from listening for the training phase signals both from the data transmitter and from any of the neighboring transmitters that have won access to the shared channel.

Otherwise, if the transmission configuration signal identifies the training phase configuration, then, at block 515, the data receiver will participate in a training phase procedure after the contention interval. If the transmission configuration signal identifies the training phase configuration, then, after the contention interval and after sending the post-contention feedback, the data receiver will begin listening for training phase signals from its data receiver and any other neighboring transmitting nodes that have won access to the shared channel. For example, base station 105 may begin listening for training phase signals from UE 115 and any other neighboring transmitting nodes that have won access to the shared channel via antennas 234*a-t* and wireless radios 700*a-t*. Alternatively, UE 115 may begin listening for training phase signals from base station 105 and any other neighboring transmitting nodes that have won access to the shared channel via wireless radios 800*a-r* and antennas 252*a-r*.

At block 516, the data receiver transmits refined feedback that identifies refined rank parameters based on the proposed rank parameters received during the training phase. For example, base station 105, under control of controller/processor 240, may activate refined feedback generator 708, stored in memory 242. The execution environment of refined feedback generator 708 allows base station 105 to generate and transmit, via antennas 234*a-t* and wireless radios 700*a-t*, refined feedback that identifies refined rank parameters based on the proposed rank parameters received during the training phase. Alternatively, UE 115, under control of controller/processor 280, may activate refined feedback generator 808, stored in memory 282. The execution environment of refined feedback generator 808 allows UE 115 to generate and transmit, via wireless radios 800*a-r* and antennas 252*a-r*, refined feedback that identifies refined rank parameters based on the proposed rank parameters received during the training phase.

The data receiver uses the proposed rank parameters identified by the training phase signal of its data transmitter and any additional proposed rank parameters identified in training phase signals above a threshold energy level from the neighboring winning nodes to estimate an interference that it may experience based on the transmissions of the nodes with access to the shared channel. For example, the execution environment of refined feedback generator 708 may allow base station 105 to use the proposed rank parameters identified by the training phase signal of its data transmitter and any additional proposed rank parameters identified in training phase signals above a threshold energy level from the neighboring winning nodes to estimate an interference that it may experience based on the transmissions of the nodes with access to the shared channel.

Alternatively, the execution environment of refined feedback generator 808 may allow UE 115 to use the proposed rank parameters identified by the training phase signal of its data transmitter and any additional proposed rank parameters identified in training phase signals above a threshold energy level from the neighboring winning nodes to estimate an interference that it may experience based on the transmissions of the nodes with access to the shared channel. The data receiver may then select appropriate refined rank parameters based on this estimated interference. For example, the execution environment of refined feedback generator 708 may allow base station 105 to select appropriate refined rank parameters based on this estimated interference. Alternatively, the execution environment of refined feedback generator 808 may allow UE 115 to select appropriate refined rank parameters based on this estimated interference. The refined rank parameters are then communicated to the data transmitter via the refined feedback. For example, base station 105 may transmit the refined rank parameters via the refined feedback to UE 115 using antennas 234a-t and wireless radios 700a-t. Alternatively, UE 115 may transmit the refined rank parameters via the refined feedback to base station 105 using wireless radios 800a-r and antennas 252a-r At block 517, the data receiver receives data from the data transmitter transmitted according to data transmission rank parameters based on the feedback received from the data receiver. For example, base station 105 may receive, via antennas 234a-t and wireless radios 700a-t, data from UE 115 transmitted according to data transmission rank parameters based on the feedback received from base station 105. Alternatively, UE 115 may receive, via wireless radios 800a-r and antennas 252a-r, data from base station 105 transmitted according to data transmission rank parameters based on the feedback received from UE 115. When the transmission configuration signal identifies the no training phase configuration, the data transmission rank parameters may be selected by the data transmitter based on the post-contention rank parameters received with the post-contention feedback, while, when the transmission configuration signal identifies the training phase configuration, the data transmission rank parameters may be selected by the data transmitter based on the refined rank parameters received with the refined feedback from the data receiver.

Figure 6:
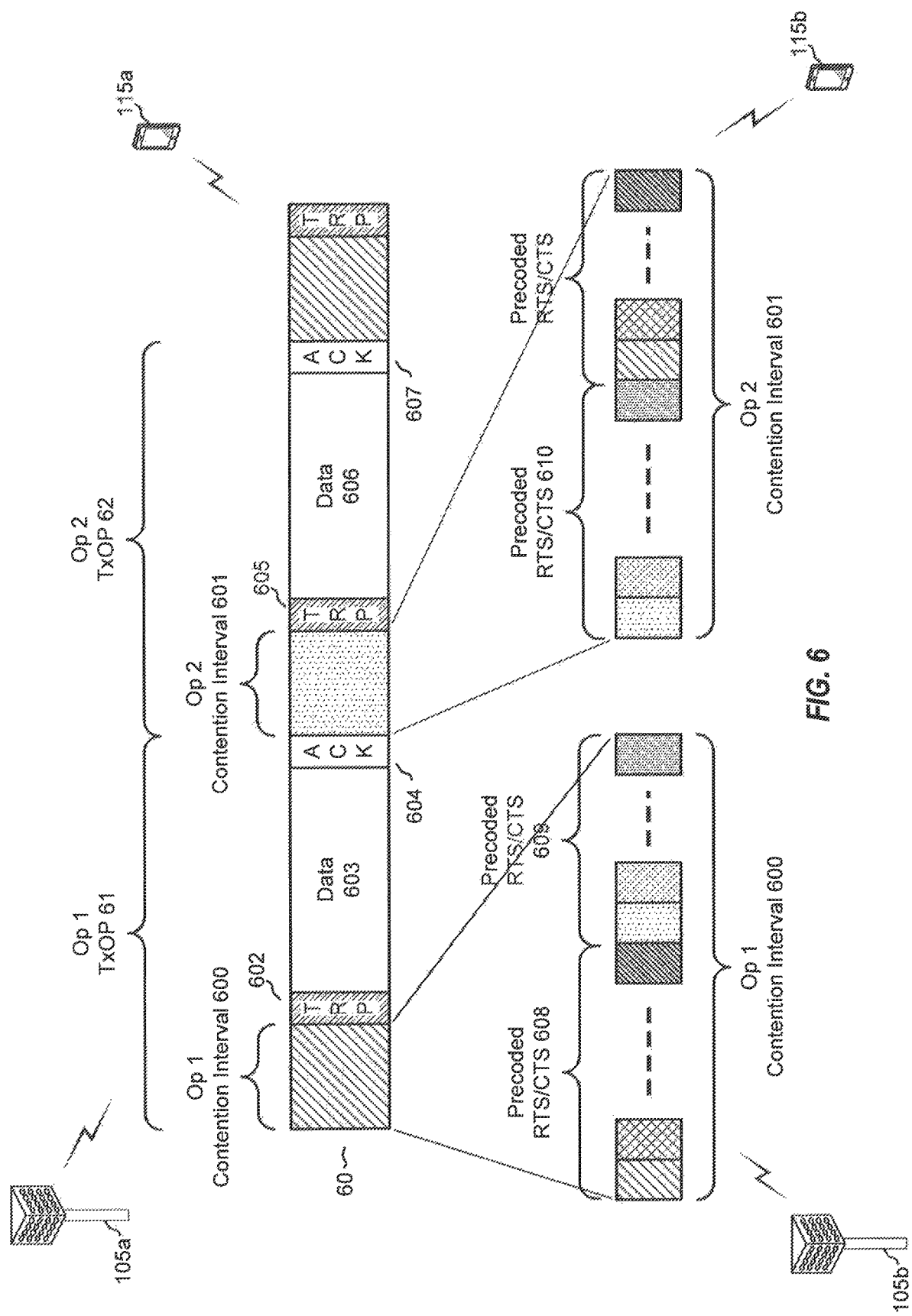
FIG. 6 is a block diagram illustrating base stations and UEs operating within an NR-SS communication network configured according to one aspect of the present disclosure.

FIG. 6 is a block diagram illustrating base stations 105a and 105b and UEs 115a and 115b operating within an NR-SS communication network configured according to one aspect of the present disclosure. Base station 105a, which provides communication with UE 115a, operates with a first network operator, while base station 105b, which provides communications with UE 115b, operates with a second network operator. Each set of communicating nodes communicates using shared communication channel 60. Shared communication channel 60 is divided into TxOP 61, with a priority for the first network operator, and TxOP 62, with a priority for the second network operator, Within TxOP 61, the first network operator, to which base station 105a and UE 115a belongs, has priority access. Contention operations occur within contention interval 600. In the described aspect, when base station 105a or UE 115a wants access to shared communication channel 60 during TxOP 61 for downlink or uplink communications, respectively, it performs a directional contention resolution procedure, such as precoded RTS/CTS 608, within contention interval 600. For scheduled downlink, base station 105a would provide a precoded RTS precoded with tentative rank and beamforming matrix vectors, while for scheduled uplink, a scheduling request to base station 105a would trigger either a precoded or uncoded RTS from base station 105a, to which UE 115a would provide a precoded CTS, precododed with the tentative rank and beamforming matrix parameters, in response to the RTS. Precoded RTS/CTS 608 operations in the contention interval 600 provide directional contention reservation signals according to a specific combination of tentative rank and tentative transmission beamforming parameters. Base station 105b or UE 115b may be able to opportunistically reserve shared communication channel 60 through their own precoded RTS/CTS operations 609 in contention interval 600 for communications during TxOP 61, even though its operator, the second network operator, does not have the priority for communications for TxOP 61. If base station 105a or UE 115a wins reservation of shared communication channel 60, then the data transmitter of base station 105a/UE 115a may transmit data 603 followed by a location scheduled for acknowledgements 604. Acknowledgements 604 may include both ACK and NAK, as described above.

Similarly, at TxOP 62, With priority access provided to base station 105b and UE 115b in TxOP 62, as part of the second network operator, after performing directional contention operations, precoded RTS/CTS 610 within contention interval 601, base station 105b and UE 115b may communicate data 606 followed by acknowledgements 607.

In one example of operations, the data transmitter, whether base station 105a or UE 115a, transmits precoded RTS/CTS 608 during contention interval 600, where precoded RTS/CTS 608 is precoded with the tentative rank parameters selected by the data transmitter. The data receiver, whether UE 115a or base station 105a, provides its contention reservation signal response (either RTS for base station 105a or CTS for UE 1154 The contention reservation response may be either also precoded with the tentative rank parameters or may be uncoded. The data receiver may also detect and decode precoded RTS/CTS 609 from either of base station 105b or UE 115b, depending on which of those entities are the transmitter competing for access to shared communication channel 60.

The receiving or decoding probability of the data receiver decoding precoded RTS/CTS 608 and 609 determines whether the transmitter/receiver pair of base station 105a and UE 115a participate in training phase 602. Precoding the tentative rank parameters of rank and transmission beamforming matrix parameters suggests designing the physical layer (PHY) to facilitate the trade-off between receiving probability and overhead cost. The decoding probability may provide an indication of this physical layer design. A high decoding probability may mean that the listener/receiver's long-term per-antennas receiving power is larger than a particular threshold power. For example, successfully decoding with a long-term per-antenna receiving power of −92 dBm may indicate a very good PHY design for decoding; −82 dBm may indicate a good PHY design; while −72 dBm may indicate a moderate PHY design.

The determination of the receiving or decoding probability may occur relatively seldom. Accordingly, the determination of whether the transmitter/receiver pair participates in training phase 602 may be signaled in system broadcast messages or semi-statically, such as, for example, in RRC messaging. A transmission configuration signal may be transmitted by the network or base station indicating whether or not the transmitter/receiver pair will have the training phase configuration or the no training phase configuration. This may be received by both nodes (data transmitter and data receiver) via master information block (MIB), system information block (SIB), or other system transmissions or via RRC signaling.

Precoding the tentative rank parameters (e.g., rank and transmission beamforming matrix parameters) into the contention reservation signals may improve performance in synchronous NR-SS systems. With a good PHY design, the preceded contention reservation signals can replace the training phase procedure in order to reduce overhead, while with moderate PHY designs, the precoded contention reservation signals can be used to facilitate an iterative rank control process with the training phase procedure. When the decoding/receiving probability exceeds a threshold decoding limit, the PHY design is considered good enough to allow the transmitter to skip the training phase. A transmission configuration signal will be transmitted or broadcast that identifies the no training phase configuration. Otherwise, if the decoding/receiving probability does not exceed the threshold, the transmission configuration signal would identify the training phase configuration.

For example, if the data transmitter and data receiver (base station 105a and UE 115a) receive the no training phase configuration, they may skip training phase 602. Similarly, data transmitter and data receiver (base station 105b and UE 115b) during TxOP 62 may skip training phase 605 if they receive the no training phase configuration. However, if the receiving/decoding probability for the receiver to decode precoded RTS/CTS 608 and 609 falls within the threshold, then the data transmitter and data receiver (base station 105a and UE 115a) would receive the training phase configuration, thus, triggering the data transmitter and data receiver to participate in training phase 602 to further refine the data rank parameters for transmission of data 603. Base station 105b oar UE 115b would similarly participate in training phase 605 if they receive indication of the training phase configuration.

After contention interval 600, the data receiver may provide the post-contention feedback to the data transmitter. The data receiver would calculate estimated interference that it may experience based on the precoded tentative rank parameters received from the data transmitter and any preceded tentative rank parameters from precoded RTS/CTS 609 that may have been received at an energy level above a threshold energy. Based on this estimated interference, the data receiver, either base station 105a or UE 115a, would select post-contention rank parameters (e.g., rank and transmission beamforming vectors) appropriate for the estimated interference. The data receiver would then transmit the post-contention rank parameters within a post-contention feedback to the data transmitter.

For the no training phase configuration, neither the data transmitter nor data receiver would participate in training phase 602. At this point, the data transmitter would set the data transmission rank based on the post-contention feedback identifying the post-contention rank parameters and send data 603 using that data rank and transmission beamforming vectors.

For the training phase configuration, the data transmitter would transmit training phase signals during training phase 602 that include proposed rank parameters that are based on the post-contention rank parameters. Additionally, the other winning transmitters (e.g., base station 105b or UE 115b) would also transmit training phase signals that include their proposed rank parameters. The data receiver listens for and decodes each of the training phase signals during training phase 602. The data receiver would then calculate an interference estimate based on the proposed rank parameters of the data transmitters and the other winning nodes which have training phase signals received at an energy above the threshold energy level. The data receivers uses this estimated interference calculation to select refined rank parameters, which can be communicated to the data transmitter in a refined feedback. The data transmitter (e.g., base station 105a or UE 115a) may then set the data transmission rank and transmission beamforming vectors for transmitting data 603.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A-5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination, Also, as used herein, including in the claims, "or" as used in a list of items prefaced by "at least one of" indicates a disjunctive list such that, for example, a list of "at least one of A, B, or C" means A or B or C or AB or AC or BC or ABC A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
participating, by a data transmitter, in a contention resolution process during a contention interval with a data receiver for access to a shared communication channel, wherein the data transmitter transmits a precoded contention reservation signal precoded with tentative rank parameters, and wherein the tentative rank parameters rank parameters include a tentative rank indicator and tentative transmission beamforming parameters;
receiving, by the data transmitter, post-contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel;
setting, by the data transmitter, data transmission rank parameters according to feedback received from the data receiver; and
transmitting, by the data transmitter, data to the data receiver using the data transmission rank parameters.

2. The method of claim 1, further including:
receiving, by the data transmitter, a transmission configuration signal, wherein the transmission configuration signal indicates one of: a training phase configuration or a no training phase configuration; and
in response to the transmission configuration signal indicating the training phase configuration:
participating, by the data transmitter, in a training phase after the contention interval, wherein each transmitter that won access to the shared communication channel transmits training phase signals identifying proposed rank parameters; and
receiving, by the data transmitter, refined feedback from the data receiver, wherein the refined feedback identifies refined rank parameters based on the proposed rank parameters received during the training phase, wherein the feedback used to set the data transmission rank parameters is the refined feedback with the refined rank parameters.

3. The method of claim 2, wherein, in response to the transmission configuration signal indicating the no training phase configuration, the feedback used to set the data transmission rank parameters is the post-contention feedback with the post-contention rank parameters.

4. The method of claim 2,
wherein the transmission configuration sign& indicating the training phase configuration is associated with a receiving probability of the precoded contention reservation signals at the data receiver being below a threshold value, and
wherein the transmission configuration signal indicating the no training phase configuration is associated with the receiving probability exceeding the threshold value.

5. The method of claim 1, further including:
setting, by the data transmitter, the tentative rank parameters to a most-recently used rank parameters of a previous transmission opportunity of the data transmitter.

6. The method of claim 1, wherein the tentative rank indicator comprises a tentative pilot rank.

7. A method of wireless communication, comprising:
participating, by a data receiver, in a contention resolution process during a contention interval with a data transmitter contending for access to a shared communication channel, wherein the data receiver receives a precoded contention reservation signal precoded with tentative rank parameters from the data transmitter, and wherein the tentative rank parameters rank parameters include a tentative rank indicator and tentative transmission beamforming parameters;
detecting, by the data receiver, one or more sets of precoded contention reservation signals detected above a threshold energy level during the contention interval from one or more nodes contending for access to the shared communication channel;
transmitting, by the data receiver, post-contention feedback after the contention interval, wherein the post-contention feedback includes post-contention rank parameters based on one or more of the one or more sets of precoded contention reservation signals from one or more nodes that won access to the shared communication channel; and receiving, at the data receiver, data from the data transmitter transmitted according to data transmission rank parameters based on feedback transmitted by the data receiver.

8. The method of claim 7, further including:

receiving, by the data receiver, a transmission configuration signal, wherein the transmission configuration signal indicates one of: a training phase configuration or a no training phase configuration; and in response to the transmission configuration signal indicating the training phase configuration:

participating in a training phase, by the data receiver, after the contention interval, wherein each node that won access to the shared communication channel transmits training phase signals identifying proposed rank parameters; and transmitting, by the data receiver, refined feedback that identifies refined rank parameters based on the proposed rank parameters received during the training phase, wherein the data transmission rank parameters are further based on the refined rank parameters of the refined feedback.

9. The method of claim 8, further including:

refraining, by the data receiver, from participating in the training phase and from transmitting the refined feedback in response to the transmission configuration signal indicates the no training phase configuration, wherein the data transmission rank parameters are based on the post-contention rank parameters of the post-contention feedback.

10. The method of claim 8, wherein the transmission configuration signal indicating the training phase configuration is associated with a receiving probability of the precoded contention reservation signals at the data receiver being below a threshold value, and wherein the transmission configuration signal indicating the no training phase configuration is associated with the receiving probability exceeding the threshold value.

11. The method of claim 7, wherein the tentative rank indicator comprises a tentative pilot rank.

12. An apparatus configured for wireless communication, the apparatus comprising:

at least one processor; and a memory coupled to the at least one processor, wherein the at least one processor is configured:

to participate, by a data transmitter, in a contention resolution process during a contention interval with a data receiver for access to a shared communication channel, wherein the data transmitter transmits a precoded contention reservation signal precoded with tentative rank parameters, and wherein the tentative rank parameters rank parameters include a tentative rank indicator and tentative transmission beamforming parameters;

to receive, by the data transmitter, post contention feedback from the data receiver after the contention interval, wherein the post-contention feedback includes post-contention rank parameters based on one or more sets of precoded contention reservation signals detected above a threshold energy level during the contention interval from one or more nodes that won access to the shared communication channel;

to set, by the data transmitter, data transmission rank parameters according to feedback received from the data receiver; and to transmit, by the data transmitter, data to the data receiver using the data transmission rank parameters.

13. The apparatus of claim 12, further including configuration of the at least one processor:

to receive, by the data transmitter, a transmission configuration signal, wherein the transmission configuration signal indicates one of: a training phase configuration or a no training phase configuration; and executable in response to the transmission configuration signal indicating the training phase configuration:

to participate, by the data transmitter, in a training phase after the contention interval, wherein each transmitter that won access to the shared communication channel transmits training phase signals identifying proposed rank parameters; and to receive, by the data transmitter, refined feedback from the data receiver, wherein the refined feedback identifies refined rank parameters based on the proposed rank parameters received during the training phase, wherein the feedback used to set the data transmission rank parameters is the refined feedback with the refilled rank parameters.

14. The apparatus of claim 13, wherein, in response to the transmission configuration signal indicating the no training phase configuration, the feedback used to set the data transmission rank parameters is the post-contention feedback with the post-contention rank parameters.

15. The apparatus of claim 13, wherein the transmission configuration signal indicating the training phase configuration is associated with a receiving probability of the precoded contention reservation signals at the data receiver being below a threshold value, and wherein the transmission configuration signal indicating the no training phase configuration is associated with the receiving probability exceeding the threshold value.

16. The apparatus of claim 12, further including configuration of the at least one processor to set, by the data transmitter, the tentative rank parameters to a most-recently used rank parameters of a previous transmission opportunity of the data transmitter.

17. The apparatus of claim 12, wherein the post-contention rank parameters and the data transmission rank parameters each include: a corresponding rank indicator and corresponding transmission beamforming parameters.

18. An apparatus configured for wireless communication, the apparatus comprising:

at least one processor; and a memory coupled to the at least one processor, wherein the at least one processor is configured:

to participate, by a data receiver, in a contention resolution process during a contention interval with a data transmitter contending for access to a shared communication channel, wherein the data receiver receives a precoded contention reservation signal precoded with tentative rank parameters from the data transmitter and wherein the tentative rank parameters rank parameters include a tentative rank indicator and tentative transmission beamforming parameters;

to detect, by the data receiver, one or more sets of precoded contention reservation signals detected above a threshold energy level during the contention interval from one or more nodes contending for access to the shared communication channel;

to transmit, by the data receiver, post-contention feedback after the contention interval, wherein the post-contention feedback includes post-contention rank parameters based on one or more of the one or more sets of precoded contention reservation signals from one or more nodes that won access to the shared communication channel; and to receive, at the data receiver, data from the data transmitter transmitted according to data transmission rank parameters based on feedback transmitted by the data receiver.

19. The apparatus of claim 18, further including configuration of the at least one processor to receive, by the data receiver, a transmission configuration signal, wherein the transmission configuration signal indicates one of: a training phase configuration or a no training phase configuration; and executable in response to the transmission configuration signal indicating the training phase configuration:

to participate in a training phase, by the data receiver, after the contention interval, wherein each node that won access to the shared communication channel transmits training phase signals identifying proposed rank parameters; and to transmit, by the data receiver, refined feedback that identifies refined rank parameters based on the proposed rank parameters received during the training phase, wherein the data transmission rank parameters are further based on the refined rank parameters of the refined feedback.

20. The apparatus of claim 19, further including configuration of the at least one processor to refrain, by the data receiver, from executing the configuration to participate in the training phase and from executing the configuration to transmit the refined feedback in response to the transmission configuration signal indicates the no training phase configuration, wherein the data transmission rank parameters are based on the post-contention rank parameters of the post-contention feedback.

21. The apparatus of claim 19,
wherein the transmission configuration signal indicating the training phase configuration is associated with a receiving probability of the precoded contention reservation signals at the data receiver being below a threshold value, and
wherein the transmission configuration signal indicating the no training phase configuration is associated with the receiving probability exceeding the threshold value.

22. The apparatus of claim 18, wherein the post-contention rank parameters and the data transmission rank parameters each include: a corresponding rank indicator and corresponding transmission beamforming parameters.

* * * * *